(12) United States Patent
Wang et al.

(10) Patent No.: US 7,737,890 B2
(45) Date of Patent: *Jun. 15, 2010

(54) METHOD AND DEVICE FOR TRANSMITTING SIGNALS IN A WIRELESS COMMUNICATION SYSTEM, RECEIVING DEVICE FOR RECEIVING SIGNALS IN A WIRELESS COMMUNICATION SYSTEM, WITH A SPECIAL FRAME STRUCTURE

(75) Inventors: Zhaocheng Wang, Stuttgart (DE); Masahiro Uno, Fellbach (DE); Volker Wullich, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,530

(22) Filed: Feb. 10, 2009

(65) Prior Publication Data

US 2009/0153400 A1    Jun. 18, 2009

Related U.S. Application Data

(63) Continuation of application No. 11/853,403, filed on Sep. 11, 2007, now Pat. No. 7,511,663.

(30) Foreign Application Priority Data

Oct. 9, 2006    (EP) ................................ 06021151

(51) Int. Cl.
*H04B 7/00* (2006.01)
*H04B 7/005* (2006.01)
(52) U.S. Cl. ........................................ 342/367; 455/69
(58) Field of Classification Search ................. 342/367, 342/368, 372; 455/69–70, 72, 562.1
See application file for complete search history.

(56) References Cited

U.S. PATENT DOCUMENTS 5,446,922 A    8/1995    Siwiak et al.

(Continued)

FOREIGN PATENT DOCUMENTS

EP    1 659 813 A1    5/2006

*Primary Examiner*—Thomas H Tarcza
*Assistant Examiner*—Fred H Mull
(74) *Attorney, Agent, or Firm*—Oblon, Spivak, McClelland, Maier & Neustadt, L.L.P.

(57) ABSTRACT

The present invention relates to a method for transmitting signals in a wireless communication system, in which signals are transmitted from a first communication device to a second communication device, said signals being transmitted in consecutive frames, each frame having a preamble section including preamble information, at least one of said first and said second communication devices having a narrow beam antenna which is adapted to be steered to different positions, each of said different positions corresponding to one of a number of different transmissions paths from said to said second communication device, including the steps of transmitting and receiving a first preamble section including preamble information enabling the estimation of a channel quality of a current transmission path, while said narrow beam antenna is in a current position corresponding to said current transmission path, steering said narrow beam antenna from said current position to a different position corresponding to a candidate transmission path, and transmitting and receiving a second preamble section including preamble information enabling the estimation of a channel quality of said candidate transmission path while said narrow beam antenna is in said different position. The present invention further relates to a corresponding transmission device as well as a receiving device.

18 Claims, 4 Drawing Sheets

U.S. PATENT DOCUMENTS

| | | | |
|---|---|---|---|
| 7,511,663 B2 * | 3/2009 | Wang et al. | 342/367 |
| 2004/0185782 A1 | 9/2004 | Halford et al. | |
| 2005/0075142 A1 | 4/2005 | Hoffmann et al. | |
| 2005/0227661 A1 | 10/2005 | Ginzburg | |
| 2006/0077935 A1 | 4/2006 | Hamalainen et al. | |

* cited by examiner

METHOD AND DEVICE FOR TRANSMITTING SIGNALS IN A WIRELESS COMMUNICATION SYSTEM, RECEIVING DEVICE FOR RECEIVING SIGNALS IN A WIRELESS COMMUNICATION SYSTEM, WITH A SPECIAL FRAME STRUCTURE

CROSS-REFERENCE TO RELATED APPLICATIONS

This application is a Continuation of and claims the benefit priority from U.S. Ser. No. 11/853,403, filed Sep. 11, 2007, the entire contents of which are incorporated herein by reference. U.S. Ser. No. 11/853,403 claims the benefit of priority from European Application No. 06 021 151.3, filed Oct. 9, 2006.

BACKGROUND OF THE INVENTION

1. Field of the Invention

The present invention relates to a method and a device for transmitting signals in a wireless communication system, as well as to a receiving device for receiving signals in a wireless communication system with a special frame structure enabling a high data rate transmission and reception with at least one steerable narrow beam (sharp beam) antenna.

2. Discussion of the Background

Wireless communication is used in a large variety of technical fields, such as mobile telephone, wireless LAN, walky-talkies, broadcast radio systems, point-to-point radio systems and many other known and future applications. The communication radius covered by a respective wireless communication system basically depends on the technique used. Whereas cellular communication systems, such as the GSM and the UMTS system, are adapted for a communication radius up to about 10 km (or more), wireless LAN is in the range of about 100 m (or more) and the Bluetooth system is in the range of several 10 m (or more). The major influences on the communication range of a wireless communication system are the radio frequency and output power used. Although only little absorption of electromagnetic waves in the atmosphere occurs at the radio frequency used for GSM and UMTS, a significant absorption occurs in the 60 GHz range, which makes it quite well suited for low range and indoor wireless communication. Furthermore, the kind of transmission and/or reception antennas used for a respective wireless communication technique varies depending on a respective field of application. For example, if a number of receivers has to be reached or if the location of the receivers is unknown or varies frequently, e.g. due to movement, wide beam antennas or omni-directional antennas are sometimes used. However, the utilization of wide beam antennas in high data rate millimeter wave wireless communication systems is problematic, because of the multi-path fading effect. For example, if wide beam antennas are used both on the transmitter and the receiver side and if the direct line of sight (LOS) link is blocked by an obstacle, such as a moving human being, a vehicle or the like, there exist a lot of reflection paths between the transmitter and the receiver, i.e. transmission paths in which the transmitted electromagnetic wave is reflected at least once by objects before it reaches the receiver. The channel delay spread might be over tens of symbol periods when the data rate is high, e.g. over 1 Gbps, which leads to severe inter-symbol interference due to deep frequency selective fading.

Two conventional solutions exist for such kind of non line of sight (NLOS) user scenarios, whereby both of these solutions need high-speed and complex signal processing circuits. One solution adopts a channel equalizer including linear, decision feedback or maximum likelihood sequence estimation (MLSE) equalizer. When the channel delay spread is much longer than the symbol duration, the equalizer becomes complex and needs a lot of processing power. Another solution is the orthogonal frequency division multiplexing (OFDM) technique, which is already adopted in wireless LAN systems. However, due to its inherent linear modulation and high peak to average ratio problems, the power consumption of the power amplifier (PA) in such systems is very high. Obviously, a high speed Fast Fourier Transformation and other signal processing modules are required for demodulating a 1 Gbps signal. Therefore, it is important to find other solutions which do not require complex and high speed base band circuitry for high data rate millimeter wave range communication systems.

SUMMARY OF THE INVENTION

The above objections are achieved by a method for transmitting signals in a wireless communication system according to claim 1, a transmitting device for transmitting signals in a wireless communication system according to claim 9 and a receiving device for receiving signals in a wireless communication system according to claim 17.

According to the present invention, a method for transmitting signals in a wireless communication system, in which signals are transmitted from a first communication device to a second communication device, said signals being transmitted in consecutive frames, each frame having a preamble section comprising preamble information, at least one of said first and said second communication devices having a narrow beam antenna which is adapted to be steered to different positions, each of said different positions corresponding to one of a number of different transmission paths from said first to said second communication device, comprises the steps of transmitting and receiving a first preamble section comprising preamble information enabling the estimation of a channel quality of a current transmission paths, while said narrow beam antenna is in a current position corresponding to said current transmission path, steering said narrow beam antenna from said current position to a different position corresponding to a candidate transmission path, and transmitting and receiving a second preamble section comprising preamble information enabling the estimation of a channel quality of said candidate transmission path while said narrow beam antenna is in said different position.

Advantageously, at least some of said frames comprise a first and a second preamble section. Further advantageously, every frame comprises a first and a second preamble section. This means that a first and a second preamble section are contained in each frame. In an alternative embodiment, the first and the second preamble section are advantageously transmitted in different frames. Hereby, the number of transmitted frames comprising a second preamble section in relation to the number of transmitted frames comprising a first preamble section is varied depending on a detected channel quality for the current transmission path. Further advantageously, the number of transmitted frames comprising a second preamble section in relation to the number of transmitted frames comprising a first preamble section is varied depending on a detected movement information in relation to the first and/or the second communication device. Further advantageously, after each frame comprising a second preamble section a frame comprising a first preamble section with a longer length as compared to the normally transmitted frames comprising a first preamble section is transmitted. Further advantageously, the first and the second preamble sections are different from each other.

According to the present invention, a transmitting device for transmitting signals in a wireless communication system, wherein said signals are transmitted in consecutive frames, each frame having a preamble section with preamble information, comprises a narrow beam antenna adapted to be steered to different positions, each of said different positions corresponding to one of a number of different transmission paths from said transmitting device to a receiving device, a steering means adapted to steer said antenna to different positions, preamble generating means adapted to generate preamble sections comprising preamble information, control means adapted to control the transmission of a first preamble section comprising preamble information enabling the estimation of a channel quality of a current transmission path while said narrow beam antenna is in a current position corresponding to said current transmission path, and further adapted to control the transmission of a second preamble section comprising preamble information enabling the estimation of a channel quality of a candidate transmission path after said narrow beam antenna has been steered to a different position corresponding to said candidate transmission path.

Advantageously, the control means is adapted to control the transmission of at least some frames comprising a first and a second preamble section. Further advantageously, the control means is adapted to control the transmission of signals in which every frame comprises a first and a second preamble section. In an alternative embodiment, the control means is adapted to control the transmission of signals in which said first and said second preamble section are transmitted in different frames. Hereby, the control means is advantageously adapted to vary the number of frames comprising a second preamble section in relation to the number of frames comprising a first preamble section depending on a detected channel quality for the current transmission path. Further advantageously, the control means is adapted to vary the number of transmitted frames comprising a second preamble section in relation to the number of transmitted frames comprising a first preamble section depending on a detected movement information in relation to the transmission and/or the receiving device. Hereby, the control means is advantageously adapted to control the transmission of signals so that after each frame comprising a second preamble section a frame comprising a first preamble section with a longer length as compared to the normally transmitted frames comprising a first preamble section is transmitted. Advantageously, the first and the second preamble sections are different from each other.

According to the present invention, a receiving device for receiving signals in a wireless communication system, wherein said signals are transmitted and received in consecutive frames, each frame having a preamble section with preamble information, comprises a narrow beam antenna adapted to be steered to different positions, each of said different positions corresponding to one of a number of different transmission paths from a transmitting device to a receiving device, a steering means adapted to steer said antenna to different positions, channel estimation means adapted to estimate a channel quality on the basis of received preamble information, control means adapted to control the reception of a first preamble section comprising preamble information enabling the estimation of a channel quality of a current transmission path while said narrow beam antenna is in a current position corresponding to said current transmission path, and further adapted to control the reception of a second preamble section comprising preamble information enabling the estimation of a channel quality of a candidate transmission path after said narrow beam antenna has been steered to a different position corresponding to said candidate transmission path.

Advantageously, the control means is adapted to control the reception of at least some frames comprising a first and a second preamble section, hereby, the control means is advantageously adapted to control the reception of signals in which every frame comprises a first and a second preamble section. In an alternative embodiment, the control means is advantageously adapted to control the reception of signals in which said first and said second preamble section are transmitted in different frames. Hereby, the control means is advantageously adapted to control the reception of signals in which the number of frames comprising a second preamble section in relation to the number of frames comprising a first preamble section is varied depending on the detected channel quality for the current transmission path. Hereby, the control means is advantageously adapted to control the reception of signals in which the number of transmitted frames comprising a second preamble section in relation to the number of transmitted frames comprising a first preamble section is varied depending on a detected movement information in relation to the first and/or the second communication device. The control means is further advantageously adapted to control the reception of signals so that after each frame comprising a second preamble section a frame comprising a first preamble section with a longer length as compared to the normally transmitted frames comprising a first preamble section is received. Further, the control means is advantageously adapted to control the reception of first and second preamble sections which are different from each other.

The present invention therefore provides a solution for a high data rate wireless communication in the millimeter wave length range which does not require a complex and high-speed processing. Specifically, when the transmission data rate becomes high, e.g. in the range of 1 Gbps or beyond, the frame length should be shortened in order to keep the performance of the frame error rate (FER) under the same bit error rate (BER). When the frame length becomes shorter, the overhead, i.e. the preamble information, necessary for the beam steering algorithm is higher. The present invention enables to reduce this overhead by defining a new frame structure including the definition of different types of frames, and how to combine these new types of frames together to enable both a wireless data communication with a high data rate and a narrow beam antenna steering. The specific advantages of the present invention are that the additional overhead for the beam steering is low, the frame length can be shortened for high data wireless communication systems in order to improve the performance of the frame error rate under the same bit error rate, and the speed of the beam steering can be dynamically changed and increased.

It is to be noted that the present invention can be applied to any kind of wireless communication system which enables the transmission and reception of signals over any kind of range. Further, the present invention is not restricted to any kind of modulation schemes or technical implementation of the wireless communication. Some embodiments and implementations of the present invention, however, might be advantageous in short and/or mid range wireless communication systems in which signals are transmitted in the millimeter wave range, as e.g. the 60 Ghz transmission range. Further, the transmitting device and the receiving device of the present invention can be any kind of device adapted to transmit and receive, respectively, signals in a wireless communication system. The terms 'transmitting device' and 'receiving device' are hereby intended to comprise any kind of portable and/or stationary communication equipment, unit, means, system and so forth. The signals to be transmitted from the transmitting device to the receiving device according to the present invention may comprise any kind of information, data, symbols and so forth which can be transmitted from a transmitter to a receiver for any kind of reason and utility. According to the present invention, at least one of the transmitting device and the receiving device comprise a narrow beam antenna which is adapted to be steered to different positions. In some implementations it might be preferable that the transmitting device and the receiving device each comprise a narrow beam antenna which is adapted to be steered to different positions. The term 'narrow beam antenna' is hereby intended to comprise and cover all kinds of antennas which, in contrary to omni-directional antennas which do not have a specific transmission and/or reception direction, have a specific transmission and/or reception direction without any limitation to the specific shape of the antenna beam. Further, the narrow beam antenna of the present invention is not restricted to any specific steering type, i. e. the specific technical implementation which enables the steering or switching of the narrow beam antenna to different transmitting and/or reception positions as long as the transmitting and/or receiving direction of the narrow beam antenna can be changed, switched, varied and the like. For example, but not exclusively, a narrow beam antenna according to the present invention may be an antenna with a fixed narrow beam radiation pattern, which can be varied by mechanically or electrically shifting the antenna so that the beam direction is varied. Further, the narrow beam antenna could be an antenna type which can be steered by changing the phase and/or the gain of the antenna so that the beam direction changes. As a further alternative, the narrow beam antenna could consist of an antenna pattern, whereby each of the antenna elements of the antenna pattern has a specific narrow beam antenna direction and the elements can be controlled in a way that the beam direction of the antenna is changed. Many other examples of steerable narrow beam antennas can be made, which are currently known or which may be developed in the future, but which would fall under the scope of the present invention.

BRIEF DESCRIPTION OF THE DRAWINGS

The present invention will be explained in more detail in the following description of preferred embodiments in relation to the enclosed drawings, in which FIG. 1 schematically shows a transmitting device according to the present invention, FIG. 2 schematically shows a receiving device according to the present invention, FIG. 3 schematically shows a variety of transmission paths between a transmitter and a receiver, FIG. 4 schematically shows a first embodiment of a frame according to the present invention, FIG. 5 schematically shows a second embodiment of frames according to the present invention, FIG. 6 schematically shows the implementation of the second embodiment in consecutive frames, FIG. 7 schematically shows the implementation of the second embodiment in a consecutive number of frames, FIG. 8 schematically shows a further variation of frames within the second embodiment, and FIG. 9 schematically shows the implementation of the frames of FIG. 8 in a number of consecutive frames.

DETAILED DESCRIPTION OF EMBODIMENTS

Figure 1:
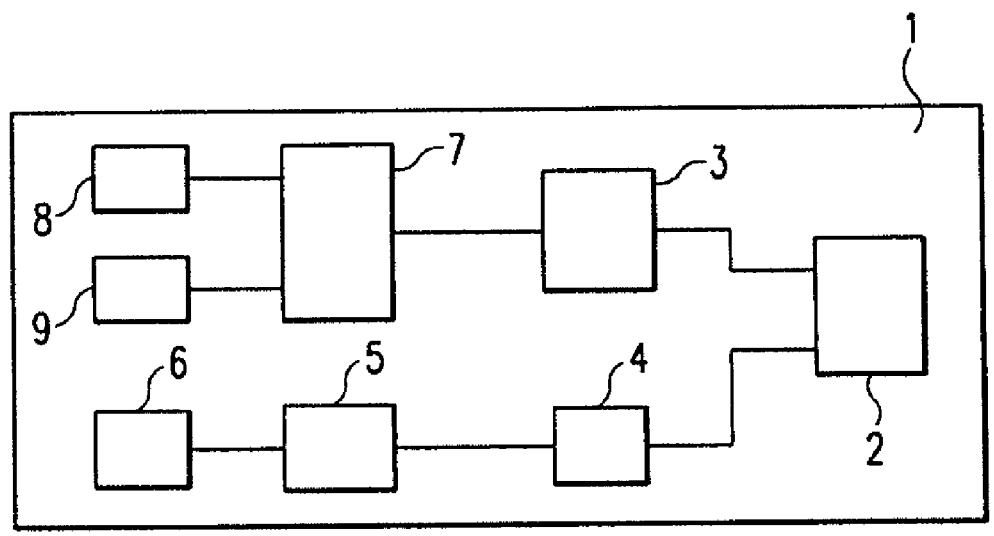

FIG. 1 shows a schematic block diagram of a transmitting device for transmitting signals in a wireless communication system according to the present invention. Hereby, the transmitting device 1 of the present invention as shown in FIG. 1 is only displayed with elements which are necessary for the implementation and the understanding of the present invention. All other necessary elements enabling the transmitting device 1 to transmit signals in a wireless communication system are not shown for the sake of clarity. However, in a practical implementation, all such elements would be implemented.

The transmitting device 1 comprises a narrow beam antenna 2 which is adapted to be steered to different positions under the control of an antenna steering means 4, which itself is controlled by a control means 5. The control means 5 can be a baseband processing and/or controlling means of the transmitting device 1 or any other suitable control unit. The control means 5 is connected to a memory 6 for storing data, information, applications, software code and so forth.

Figure 4:
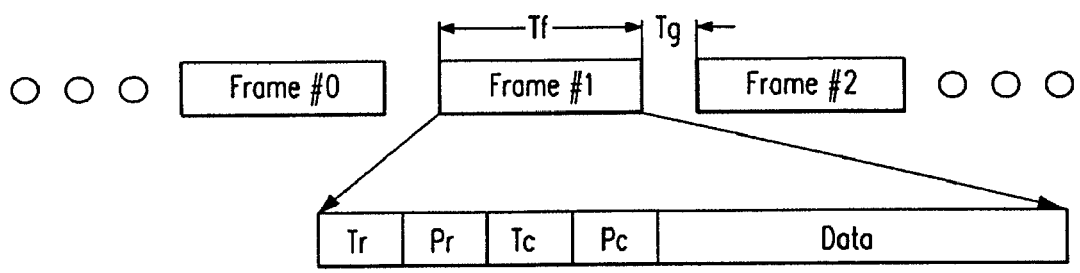
Figure 5:
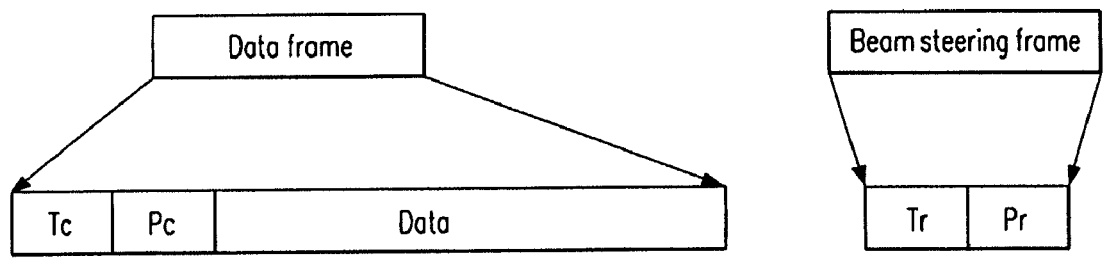
Figure 6:
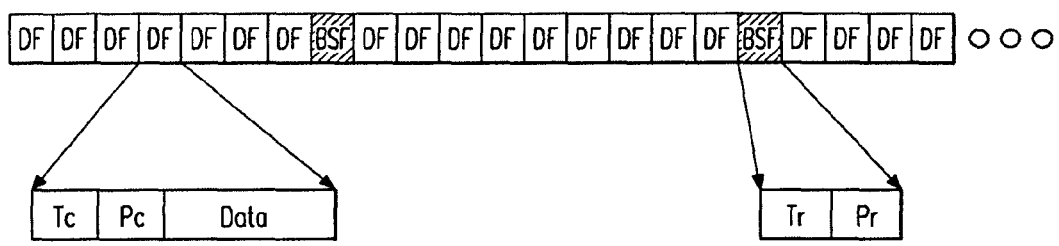
Figure 7:
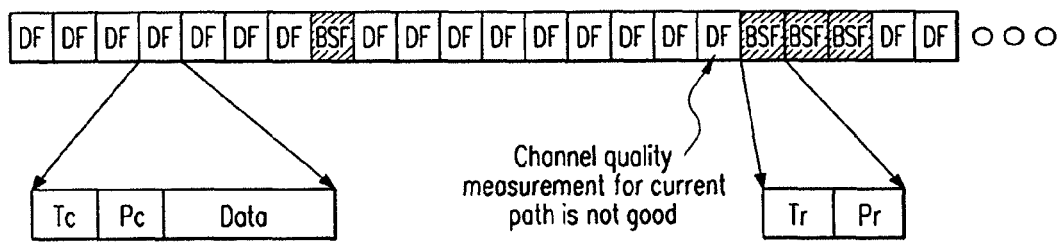
Figure 8:
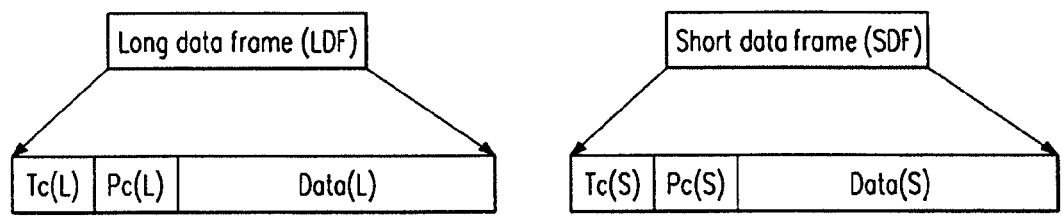
Figure 9:
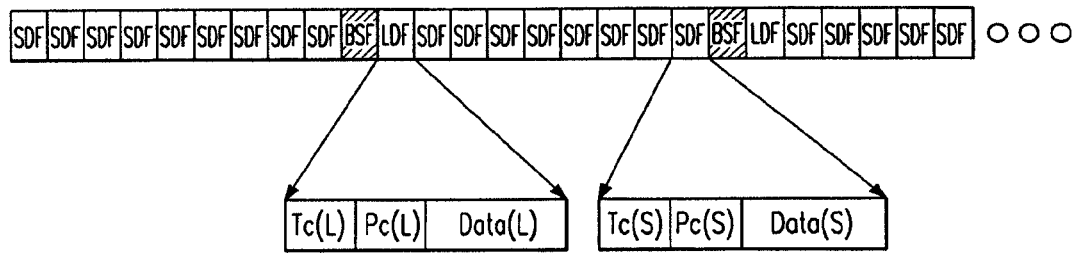

The transmitting device 1 is adapted to transmit signals in consecutive time frames, whereby each frame has a preamble section comprising preamble information. Examples of such frames are shown in FIGS. 4, 5 and 8. Examples for a number of consecutive time frames transmitted by the transmitting device 1 are shown in FIGS. 6, 7 and 9. Hereby, it is to be understood that the term 'consecutive' does not necessarily mean that the frames are transmitted immediately one after the other. In some implementations there might be an interval Tg between two consecutive frames, which e. g. can be used to handle the clock difference between a transmitting device 1 and a receiving side, such as the receiving device 10 as shown and explained in FIG. 2, in order to support long time and high rate wireless communications, such as wireless high definition television or the like. In the following description and explanations, the interval Tg between two consecutive time frames is assumed to be zero. In a first embodiment of the frame structure according to the present invention which is shown in FIG. 4, a frame, such as frame shown in FIG. 4 having a length of Tf, comprises a preamble section and a data section. The preamble section is generated by a preamble section generator 9 of the transmitting device 1, whereby the preamble generation can either take place in the frequency domain or the time domain processing. Further, the preambles generated by the preamble section generator 9 can have different lengths and sizes depending on the wanted implementation. The frames are formed by a frame generator 7 which obtains the preamble sections from the preamble section generator 9 and the data from the data means 8. The data means 8 generates, collects, or obtains the data in any kind of suitable way and forwards the data to the frame generator 7. After a frame has been generated by the frame generator 7, the generated frames are then further processed in the usual manner, e. g. by modulating the frame information or the like, which are then up-converted and transmitted via a high frequency means 3 through the narrow beam antenna 2.

The preamble section of the frames of the first embodiment as shown in FIG. 4 comprises essentially four parts, namely a training sequence Tr for aligning the direction of narrow beam antenna to candidate transmission paths, time and frequency synchronization, a preamble sequence Pr enabling the estimation of channel quality information in a receiver for that candidate path, a training sequence Tc for aligning the direction of narrow beam antenna to a currently used transmission path, time and frequency synchronization, and a preamble sequence Pc enabling the estimation of channel quality information in a receiving device for the currently used transmission path as well as the frame timing in the receiving device.

Figure 2:
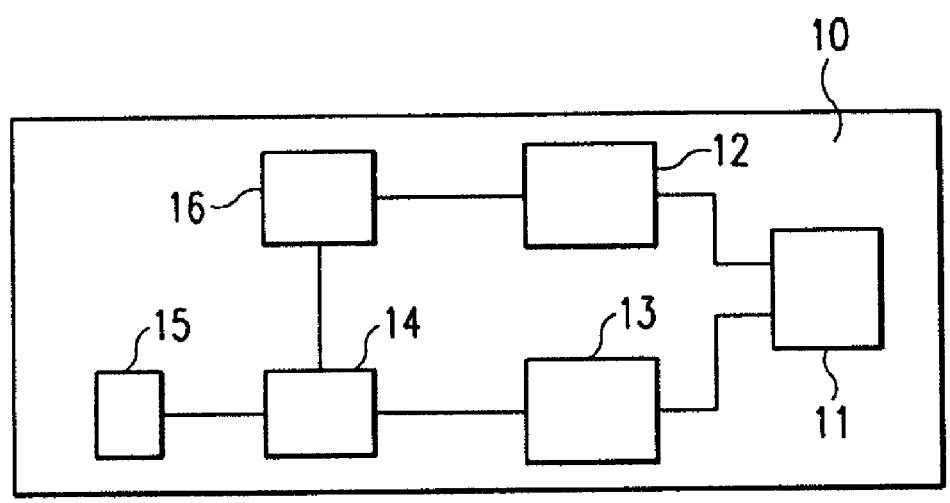

An example of a receiving device 10 for receiving signals in a wireless communication system according to the present invention is schematically shown in the block diagram of FIG. 2. The receiving device 10 comprises a narrow beam antenna 11 which is adapted to be steered to different positions by an antenna steering means 13 under the control of a control means 14. The control means 14 can be any kind of suitable control means, such as a baseband processing means of the receiving device 10, or any other suitable control and/or processing device. The control means 14 is connected to a memory means 15 adapted to store data, information, applications, software programs and so forth necessary for the operation of the receiving device 10. The receiving device 10 further comprises a high frequency section 12 which is used to downconvert the received signals via the antenna 11, which are then further processed in the usual manner in the receiving device 10. For example, a channel estimator 16 is adapted to perform a channel estimation on the basis of received preamble information. The channel estimation information derived by the channel estimator 16 can e. g. be used in the control means 14 for steering the antenna 11 to a suitable position via the antenna steering means 13. It is to be noted that FIG. 2 only shows the necessary elements for understanding the present invention. In a practical implementation the receiving device 10 would comprise all other necessary elements for the operation of the receiving device 10 enabling the reception of signals in a wireless communication system. Further, it is to be noted that the receiving device 10 can additionally comprise all necessary elements and functionalities to transmit signals in the wireless communication system either via the antenna 11 or a separate transmission antenna. Likewise, the transmitting device 1 could comprise all necessary elements and functionalities enabling the reception of signals in the wireless communication system either via the antenna 2 or a separate reception antenna. Further, the elements and functionalities of the transmitting device 1 shown and explained in relation to FIG. 1 and of the receiving device 10 shown and explained in relation to FIG. 2 could be combined in a communication device 1 enabling the transmission and reception of signals in the wireless communication system.

Figure 3:
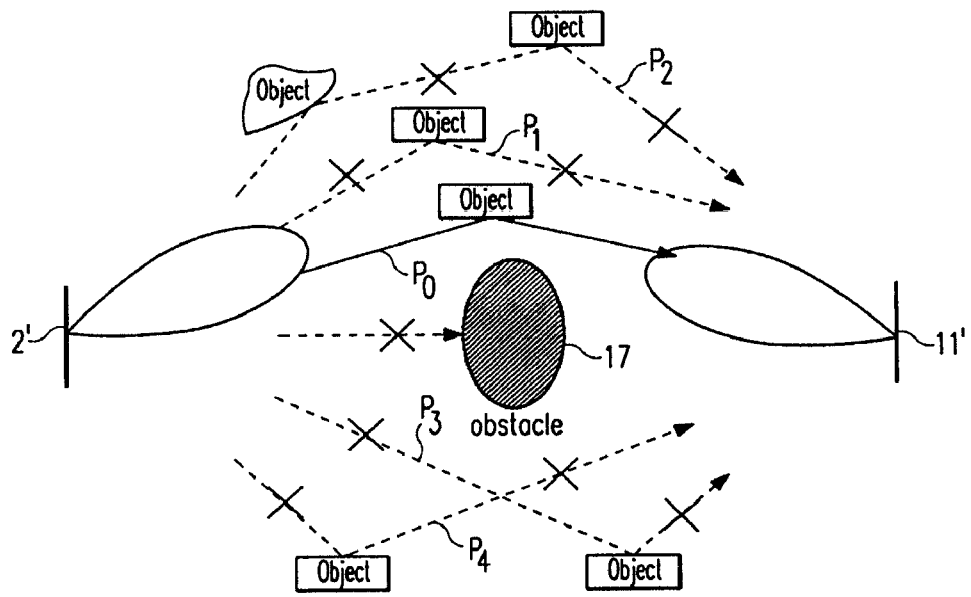

FIG. 3 shows a schematic diagram of various transmission paths between a narrow beam antenna 2' of a transmitting device and a narrow beam antenna 11' of a receiving device. The transmitting narrow beam antenna 2' might be the antenna 2 of the transmitting device 1 shown in FIG. 1 and the receiving narrow beam antenna 11' might be the antenna 11 of the receiving device 10 of FIG. 2. However, it is to be understood that the present invention could also function if only the transmitting device or the receiving device has a steerable narrow beam antenna and the other device only has a wide beam or omni-directional antenna. As shown in FIG. 3, a current transmission path $P_0$ is not a direct line of sight transmission path, but is a transmission path in which the electromagnetic signals are reflected once by an object. The direct line of sight transmission path between antenna 2' and antenna 11' is blocked by an obstacle 17. Candidate transmission paths, i. e. alternative possible transmission paths between the antenna 2' and the antenna 11' are shown as transmission paths $P_1, P_2, P_3$ and $P_4$. The candidate transmission paths $P_1, P_3$ and $P_4$ are transmission paths in which the electromagnet signals are reflected once by an object. The candidate transmission path $P_2$ is a candidate transmission path in which the electromagnetic signals are reflected twice on objects. However, all reflections of the candidate transmission paths are in a way that the reflected electromagnetic signal reaches the receiving antenna 11'. However, in the example shown in FIG. 3, the currently used transmission path $P_0$ has the best channel properties, e.g. the strongest signal to noise ratio or any other suitable parameter, and is therefore currently used for transmitting frames between the transmitter and the receiver. The candidate transmission paths $P_1, P_2, P_3$ and $P_4$ are shown with broken lines indicating that the channel qualities of these candidate transmission paths are not as good as the one of the currently used transmission path $P_0$. However, in case that the channel qualities of the currently used transmission path $P_0$ changes, e. g. if the reflection object moves or if the transmission path is blocked by another object or obstacle due to movement or the like, one of the candidate transmission paths $P_1, P_2, P_3$ and $P_4$ might become the current transmission path.

Generally, FIG. 3 also visualizes that usually only a quite low number of transmission paths provide a transmission quality which enables the transmission and reception of signals between a transmitter and a receiver. In order to find and monitor all sufficiently strong transmission paths, it is necessary to search and monitor all available and possible transmission paths, whereby the transmitting narrow beam antenna 2' and the receiving narrow beam antenna 11' have a lot of two-dimensional choices. For example, if the scanning range is 100 degrees and the half power beam width (HPBW) of the sharp beam steering antenna is 20 degrees, then the number of choices from each side is 5×5=25 and the total number of choices for both the transmission and the receiving side is 25×25=625. The resulting calculation complexity is very high.

The present invention now suggests a very simple but elegant and effective way to transmit frames on a current transmission path while monitoring and checking candidate transmission paths from time to time in order to be able to switch to a different transmission path if the currently used transmission path deteriorates. Further, the present invention suggests a new frame structure which reduces the overhead for the measurement of the channel quality and enables the implementation of a fast beam steering algorithm.

As stated above, the first embodiment of the frame structure of the present invention shown in FIG. 4 suggests a frame with a structure as described above. During the training sequence Tr, the control means 5 of the transmitting device 1 causes the antenna steering means 4 to steer the antenna 2 from the position which corresponds to the currently used transmission path to a position which corresponds to a candidate transmission path. At the same time, the control means 14 of the receiving device 10 causes the antenna steering means 13 to steer the antenna 11 to a position which corresponds to the same candidate transmission path so that the training sequence Tr as well as the preamble sequence Pr can be received while the antenna 11 is in the different position corresponding to the candidate transmission path. The training sequence Tr enables the synchronization of the receiving device 10 to the transmitting device 1 over the candidate transmission path, e. g. for timing or carrier recovery, whereas the preamble sequence Pr enables the channel estimator 16 to estimate the channel quality information of the candidate transmission path. After transmission of the preamble sequence Pr, the antenna 2 of the transmitting device 1 is switched back to the position corresponding to the currently used transmission path. After receipt of the preamble sequence Pr, the antenna 11 is switched back to the position which corresponds to the currently transmission path. There-after, the training sequence Tc for the currently used transmission path is transmitted from the transmitting device 1 to the receiving device 11 and enabling synchronization, i. e. timing or carrier recovery, for the currently used transmission path in the receiving device 10. Afterwards, the preamble sequence Pc is transmitted from the transmitting device 1 to the receiving device 10 enabling the estimation of accurate channel quality information by the channel estimator 16 in the receiving device 10, as well as enabling the frame timing in the receiving device 10.

It has to be understood, and that is true for all embodiments of the present invention explained herein that the transmitting device 1 and the receiving device 10 have to have knowledge about the respectively next candidate transmission path to be used in case that both the transmitting device 1 and the receiving device 10 comprise a steerable narrow beam antenna. In case that only one of the transmitting device 1 and the receiving device 10 comprise a steerable narrow beam antenna, such previous knowledge is not absolutely necessary, but might be necessary in order to give the transmitting device 1 some feedback about which candidate transmission channel has which channel qualities. Hereby, the corresponding information could e. g. be stored in the memory means 15 of the receiving device 10 and/or the memory means 6 of the transmitting device 1, so that in case that the current transmission channel breaks down, the candidate transmission channel which had the best channel quality is chosen to become the current transmission channel and the antennas 2 and 11 are steered to the corresponding positions.

In case that the data rate should become higher, e. g. in the range of 1 Gbps, the frame length Tf or the length of the data part of the frame must be shortened as compared to the frame length Tf of the first embodiment shown in FIG. 4 in order to improve the performance of the frame error rate. For example, if the bit error rate is equal to $1 \times 10^{-7}$, if the data rate is 1 Gps, if it is assumed that the length of the data part is 10 ms and if a random error is assumed, since the number of data in each frame is $1 \times 10^7$ (10 ms multiplied with data rate of 1 Gpbs), the performance of the frame error rate is very bad. However, if e. g. the length of the data part is reduced from 10 ms to 100 μs, the number the data in each frame is $1 \times 10^5$, so that the frame error rate becomes better than 1 percent. Since the length of the training sequence Tr and the preamble sequence Pr are fixed, since they only depend on real circuits, in case that the length of the data part is reduced in each frame, the relative overhead introduced by Tr+Pr in relation to the data part becomes very high. For example, when the length of a data part in a frame is changed from 10 ms to 100 μs, the overhead increases by about 100 times. In order to solve this problem, a new physical frame structure according to the second embodiment as shown in FIG. 5 is suggested, which comprises two different types of physical layer frames, namely a data frame comprising a preamble section with a training sequence Tc and a preamble sequence Pc and a data section, as well as a beam steering frame only comprising a training sequence Tr and a preamble sequence Pr are suggested. The training sequences Tr and Tc are identical in their features and functions as the corresponding training sequences Tr and Tc, respectively, shown and explained in relation to FIG. 4. The same is true is for the preamble sequences Pr and Pc, which are identical in features and functions as the corresponding preamble sequences Pr and Pc, respectively, shown and explained in relation to FIG. 4.

As a result, by introducing the separate beam steering frames, which only and exclusively comprise the training sequence Tr and the preamble sequence Pr, the fixed speed of the beam steering algorithm does not effect a frame error rate for the data frames. As schematically illustrated in FIG. 6, the data frames of the second embodiment can be transmitted more frequently than the beam steering frames, so that the overhead introduced by the beam steering frames can be reduced. For example, the beam steering frame could be transmitted and received after a certain number of data frames during a regular transmission. However, in case that the channel quality of the currently used transmission path as estimated in the channel estimator 16 of the receiving device 10 deteriorates, the frequency of the beam steering frames can be increased in order to quickly find candidate transmission paths with a better channel quality. In other words, the number of beam steering frames which are transmitted from the transmitting device 1 to the receiving device 10 can be adapted depending on the channel quality estimated in the receiving device for the currently used transmitting path. In case that the channel quality of the currently used transmitting path deteriorates, the number of the beam steering frames is increased. Alternatively or additionally, the frequency of the beam steering frames in relation to the data frames can be dynamically adjusted based on additional features and/or parameters of the transmitting device 1 and/or the receiving device 10, e. g. the movement of one of the devices, such as the acceleration, rotation and so forth, or any other suitable parameter. An example for an increased frequency of the transmission of beam steering frames is schematically shown in FIG. 7.

As shown in FIG. 8, the data frame of the second embodiment as shown and explained in relation to FIG. 5 can comprise two types, namely a long data frame and a short data frame. As shown in FIG. 9, according to the present invention, it is suggested that a long data frame should be transmitted and received immediately after a beam steering frame has been transmitted and received. The other data frames are short data frames. Hereby, a long data frame comprises a preamble section with a training sequence Tc(L) and a preamble sequence Pc(L), and a data section. The training sequence Tc(L) is a training sequence for the currently used transmission path and has the function to enable the switching of the antennas 2 and 11 (and/or further circuitry) from the position corresponding to the candidate transmission path of the immediately preceding beam steering frame back to the position corresponding to the currently used transmission path, and then to enable synchronization, i. e. timing or carrier recovery, for the currently used transmission path in the receiving device 10. The preamble sequence Pc(L) has the function to enable the estimation of accurate channel quality information in the channel estimator 16 of the receiving device 10 for the currently used transmission path as well as the realization of frame timing in the receiving device 10. The training sequence Tc(S) of the short data frame only has the function to enable the synchronization, i. e. timing or carrier recovery, for the currently used transmission path in the receiving device 10, so that the length of Tc(S) is shorter than the length of Tc(L). In case that a re-synchronization of the receiving device 10 is not necessary, Tc(S) can be omitted. The preamble sequence Pc(S) has the function to enable the estimation of the accurate channel quality information in the channel estimator 16 of the receiving device 10 as well as the realization of the frame timing in the receiving device 10, and therefore has the same length as the preamble sequence Pc(L). The length of the data parts of the long data frame and the short data frame are the same.

As stated above, in a long data frame, due to the requirement of switching the antenna (or other circuitry) back from the candidate transmission path to the currently used transmission path and of the re-synchronization for the currently used transmission path, Tc(L) is relatively long as compared to Tc(S), which does not need to enable a switching of the antenna or other circuitry. Since, as can be seen in FIG. 9, most of the time only the transmission of a short data frame is necessary instead of the transmission of a long data frame, the overhead of Tc can be reduced dramatically. The preamble sequences of the long data frame, the short data frame and the beam steering data frame can advantageously be different from each other in order to facilitate the receiving device 10 to identify which type of frame is being transmitted and received and in order to enable the receiving device to adjust to the respective frame length. Further, the various frame types explained in the first and the second embodiment above can be either transmitted in single carriers or in multiple carriers, such as e. g. in an OFDM system.

Generally, the present invention enables the transmission and reception of signals in a wireless communication system with at least one steerable narrow beam antenna, whereby the direction of the at least one narrow beam antenna can be steered with low control overhead and a reduced frame length for high data rate wireless communication, by defining novel frame structures. From a physical layer point of view, in a first embodiment a new frame structure enabling the channel estimation for the currently used transmission path as well as a candidate transmission path is suggested, whereas in a second embodiment two different frame types, namely a data frame and a beam steering frame are suggested. Hereby, the overhead for beam steering can be reduced. A further overhead reduction can be achieved by defining two different types of data frames in the second embodiment, namely a long data frame and a short data frame as described above.

The invention claimed is:

1. A method for transmitting signals in a wireless communication system, in which signals are transmitted from a first communication device to a second communication device, said signals being transmitted in consecutive frames, each frame having a preamble section including preamble information, at least one of said first and said second communication devices having a narrow beam antenna which is configured to steer an antenna beam to different positions, each of said different positions corresponding to one of a number of different transmission paths from said first to said second communication device, the method including:

transmitting and receiving a first preamble section including preamble information enabling the estimation of a channel quality of a current transmission path, while said antenna beam is in a current position corresponding to said current transmission path;

steering said antenna beam from said current position to a different position corresponding to a candidate transmission path; and transmitting and receiving a second preamble section including preamble information enabling the estimation of a channel quality of said candidate transmission path while said antenna beam is in said different position, wherein said first and said second preamble section are transmitted in different frames, and the number of transmitted frames including a second preamble section in relation to the number of transmitted frames including a first preamble section is varied depending on a detected movement information in relation to the first and/or the second communication device.

2. A method according to claim 1, wherein after each frame including a second preamble section a frame including a first preamble section with a longer length as compared to the normally transmitted frames including a first preamble section is transmitted.

3. A method according to claim 1, wherein the first and second preamble sections are different from each other.

4. A transmission device configured to transmit signals in a wireless communication system, wherein said signals are transmitted in consecutive frames, each frame having a preamble section with preamble information, comprising:

a narrow beam antenna configured to steer an antenna beam to different positions, each of said different positions corresponding to one of a number of different transmission paths from said transmitting device to a receiving device;

a steering unit configured to steer said antenna beam to different positions;

a preamble generating unit configured to generate preamble sections including preamble information; and a control unit configured to control the transmission of a first preamble section including preamble information enabling the estimation of a channel quality of a current transmission path while said antenna beam is in a current position corresponding to said current transmission path, and further configured to control the transmission of a second preamble section including preamble information enabling the estimation of a channel quality of a candidate transmission path after said antenna beam has been steered to a different position corresponding to said candidate transmission path, to control the transmission of signals in which said first and said second preamble section are transmitted in different frames, and to vary the number of transmitted frames including a second preamble section in relation to the number of transmitted frames including a first preamble section depending on a detected movement information in relation to the transmission and/or receiving device.

5. A transmission device according to claim 4, wherein said control unit is configured to control the transmission of signals so that after each frame including a second preamble section a frame including a first preamble section with a longer length as compared to the normally transmitted frames including a first preamble section is transmitted.

6. A transmission device according to claim 4, wherein the first and second preamble sections are different from each other.

7. A receiving device configured to receive signals in a wireless communication system, wherein said signals are transmitted and received in consecutive frames, each frame having a preamble section with preamble information, comprising:

a narrow beam antenna configured to steer an antenna beam to different positions, each of said different positions corresponding to one of a number of different transmission paths from a transmitting device to said receiving device;

a steering unit configured to steer said antenna beam to different positions;

channel estimation unit configured to estimate a channel quality on the basis of received preamble information; and a control unit configured to control the reception of a first preamble section including preamble information enabling the estimation of a channel quality of a current transmission path while said antenna beam is in a current position corresponding to said current transmission path, to control the reception of a second preamble section including preamble information enabling the estimation of a channel quality of a candidate transmission path after said antenna beam has been steered to a different position corresponding to said candidate transmission path to control the reception of signals in which said first and said second preamble section are transmitted in different frames, and to control the reception of signals in which the number of transmitted frames including a second preamble section in relation to the number of transmitted frames including a first preamble section is varied depending on a detected movement information in relation to the first and/or the second communication device.

8. A receiving device according to claim 7, wherein said control unit is configured to control the reception of signals so that after each frame including a second preamble section a frame including a first preamble section with a longer length as compared to the normally transmitted frames including a first preamble section is received.

9. A receiving device according to claim 7, wherein said control unit is configured to control the reception of first and second preamble sections which are different from each other.

10. A method for transmitting signals in a wireless communication system, in which signals are transmitted from a first communication device to a second communication device, said signals being transmitted in consecutive frames, each frame having a preamble section including preamble information, at least one of said first and said second communication devices having a narrow beam antenna which is configured to steer an antenna beam to different positions, each of said different positions corresponding to one of a number of different transmission paths from said first to said second communication device, the method comprising:
    transmitting and receiving a first preamble section including preamble information enabling the estimation of a channel quality of a current transmission path, while said antenna beam is in a current position corresponding to said current transmission path;
    steering said antenna beam from said current position to a different position corresponding to a candidate transmission path; and
    transmitting and receiving a second preamble section including preamble information enabling the estimation of a channel quality of said candidate transmission path while said antenna beam is in said different position,
    wherein said first and said second preamble section are transmitted in different frames, and
    after each frame including a second preamble section, a frame including a first preamble section with a longer length as compared to the normally transmitted frames including a first preamble section is transmitted.

11. A method according to claim 10, wherein the number of transmitted frames including a second preamble section in relation to the number of transmitted frames including a first preamble section is varied depending on a detected movement information in relation to the first and/or the second communication device.

12. A method according to claim 10, wherein the first and second preamble sections are different from each other.

13. A transmission device configured to transmit signals in a wireless communication system, wherein said signals are transmitted in consecutive frames, each frame having a preamble section with preamble information, comprising:
    a narrow beam antenna configured to steer an antenna beam to different positions, each of said different positions corresponding to one of a number of different transmission paths from said transmitting device to a receiving device;
    a steering unit configured to steer said antenna beam to different positions;
    a preamble generating unit configured to generate preamble sections including preamble information; and
    a control unit configured to control the transmission of a first preamble section including preamble information enabling the estimation of a channel quality of a current transmission path while said antenna beam is in a current position corresponding to said current transmission path, and further configured to control the transmission of a second preamble section including preamble information enabling the estimation f a channel quality of a candidate transmission path after said antenna beam has been steered to a different position corresponding to said candidate transmission path, to control the transmission of signals in which said first and said second preamble section are transmitted in different frames, and to control the transmission of signals so that after each frame including a second preamble section a frame including a first preamble section with a longer length as compared to the normally transmitted frames including a first preamble section is transmitted.

14. A transmission device according to claim 13, wherein said control unit is configured to vary the number of transmitted frames including a second preamble section in relation to the number of transmitted frames including a first preamble section depending on a detected movement information in relation to the transmission and/or receiving device.

15. A transmission device according to claim 13, wherein the first and second preamble sections are different from each other.

16. A receiving device configured to receive signals in a wireless communication system, wherein said signals are transmitted and received in consecutive frames, each frame having a preamble section with preamble information, the receiving device comprising:
    a narrow beam antenna configured to steer an antenna beam to different positions, each of said different positions corresponding to one of a number of different transmission paths from a transmitting device to said receiving device;
    a steering unit configured to steer said antenna beam to different positions;
    a channel estimation unit configured to estimate a channel quality on the basis of received preamble information; and
    a control unit configured to control the reception of a first preamble section including preamble information enabling the estimation of a channel quality of a current transmission path while said antenna beam is in a current position corresponding to said current transmission path, to control the reception of a second preamble section including preamble information enabling the estimation of a channel quality of a candidate transmission path after said antenna beam has been steered to a different position corresponding to said candidate transmission path to control the reception of signals in which said first and said second preamble section are transmitted in different frames, and to control the reception of signals so that after each frame including a second preamble section a frame including a first preamble section with a longer length as compared to the normally transmitted frames including a first preamble section is received.

17. A receiving device according to claim 16, wherein said control unit is configured to control the reception of signals in which the number of transmitted frames including a second preamble section in relation to the number of transmitted frames including a first preamble section is varied depending on a detected movement information in relation to the first and/or the second communication device.

18. A receiving device according to claim 16, wherein said control unit is configured to control the reception of first and second preamble sections which are different from each other.

* * * * *